United States Patent
Chen et al.

(10) Patent No.: US 7,136,447 B2
(45) Date of Patent: Nov. 14, 2006

(54) CLOCK RECOVERY CIRCUIT

(75) Inventors: Jiu-Cheng Chen, Changhua (TW);
Chao-Chieh Yu, Taichung (TW)

(73) Assignee: Faraday Technology Corp., Hsin-Chu (TW)

( * ) Notice: Subject to any disclaimer, the term of this patent is extended or adjusted under 35 U.S.C. 154(b) by 720 days.

(21) Appl. No.: 10/366,367

(22) Filed: Feb. 14, 2003

(65) Prior Publication Data

US 2004/0161071 A1    Aug. 19, 2004

(51) Int. Cl.
*H03D 3/24* (2006.01)

(52) U.S. Cl. .................. 375/376; 375/354; 327/147
(58) Field of Classification Search ................ 375/376, 375/326, 327, 354; 327/141, 147, 156
See application file for complete search history.

(56) References Cited

U.S. PATENT DOCUMENTS 5,134,637 A * 7/1992 Beyer et al. ................ 375/357
5,757,857 A * 5/1998 Buchwald .................... 375/271

* cited by examiner

*Primary Examiner*—Temesghen Ghebretinsae
(74) *Attorney, Agent, or Firm*—Winston Hsu

(57) ABSTRACT

A clock recovery circuit for establishing bit synchronization with a received signal. The clock recovery circuit comprises a conventional early-late gate circuit and a loop filter. The loop filter receives an output signal of an early sample circuit included in the early-late gate circuit and an output signal of a late sample circuit included in the early-late gate circuit to generate a control signal output. The control signal is input to a clock-producing device included in the early-late gate circuit. The clock-producing device generates a clock at an ideal impulse-producing time controlled by the control signal. The ideal impulse-producing time is a middle point of the n-th symbol of the received signal.

6 Claims, 4 Drawing Sheets

CLOCK RECOVERY CIRCUIT

BACKGROUND OF THE INVENTION

1. Field of the Invention

The invention relates to clock extraction circuits used in digital communication, and in particular, to a clock recovery circuit implemented by early-late gate.

2. Description of the Related Art

In digital communication, receiving ends use clock recovery circuits to extract clocks from received data for establishing bit synchronization therewith. Thus, receiving ends can judge and read the received data correctly.

In wireless communication, such as Bluetooth, the clock recovery circuit is implemented by an early-late gate circuit. FIG. 1 is a block diagram illustrating an early-late gate recovery circuit in prior art. As shown in FIG. 1, the early-late gate recovery circuit comprises an early sample circuit 102, an early accumulator circuit 104, a mid-sample circuit 106, a late sample circuit 108, a late accumulator circuit 110, an adder 111, a loop filter 112 and a controlled counter 114. Received data In is input to the early-late gate recovery circuit. In the early-late gate recovery circuit, the received data is detected by the early sample circuit 102, mid-sample circuit 106 and late sample circuit 108. An output signal of the mid-sample circuit 106 is input to the adder 111. The adder 111 performs operations of an output signal of the early accumulator circuit 104 and an output signal of the late accumulator circuit 110 according to the output signal of the mid-sample circuit 106. The operational result is input to the loop filter 112. The loop filter 112 judges whether to adjust an impulse-producing time to make the controlled counter 114 produce an output clock in an ideal range.

The conventional early-late gate recovery circuit slightly adjusts the output clock according to the received data. It takes a long time for the conventional early-late gate recovery circuit to adjust the output clock to stable status (the balance of the early gate and the late gate). FIG. 2 is a schematic illustrating the output clock adjusted by the conventional early-late gate recovery circuit. Line 20 is a graph showing the received data In received by the conventional early-late gate recovery circuit. The dotted line of the line 20 is the noise of received data. Line 22 is the graph showing the output clock of the conventional early-late gate recovery circuit. As shown in FIG. 2, the conventional early-late gate recovery circuit slightly adjusts the output clock according to the received data In. It takes a long time for the conventional early-late gate recovery circuit to adjust the output clock to stable status (the balance of the early gate and the late gate). At the adjusted time, symbol jitter is too large to allow the received end to judge and read the received data correctly or the received end cannot receive packets transmitted from the transmitted end correctly. The large symbol jitter loses the transmitted packets and reduces transmission quality.

SUMMARY OF THE INVENTION

An object of the present invention is to provide a clock recovery circuit implemented to quickly adjust the recovery clock to stable status and reduce the time for the clock recovery circuit to extract the recovery clock.

Another object of the present invention is to provide a clock recovery circuit implemented to quickly adjust the recovery clock to stable status to reduce the rate of loss packets and increase the transmission quality.

Accordingly, the present invention also provides a clock recovery circuit for establishing bit synchronization with a received signal. The clock recovery circuit comprises a first sample circuit, a first accumulation circuit, a second sample circuit, a second accumulation circuit, a third sample circuit, an adding device, a loop filter, a match filter and a clock-producing device. The first sample circuit has an early clock for detecting the received signal and generates a plurality of first sample signals output. The first accumulation circuit receives the first sample signals and performs a summation operation to generate a first accumulated signal for output. The second sample circuit has a late clock for detecting the received signal and generates a plurality of second sample signals for output. The second accumulation circuit receives the second sample signals and performs a summation operation to generate a second accumulated signal for output. The third sample circuit has an on time clock for detecting the received signal and generates a plurality of third sample signals for output. The adding device computes the first sample signals and the second sample signals according to the third sample signals to generate an output signal. The loop filter receives the output signal to generate a first control signal output. The match filter derives an n-th symbol from the received signal by seeking the first sample signal and the second sample signals to generate a second control signal, wherein n is an integer. The produced clock-producing device generates a clock at an ideal impulse-producing time controlled by the first control signal and the second control signal. The ideal impulse-producing time is a middle point of the n-th symbol of the received signal. The clock-producing device is a controller counter.

DESCRIPTION OF THE DRAWINGS

For a better understanding of the present invention, reference is made to a detailed description to be read in conjunction with the accompanying drawings, in which.

DETAILED DESCRIPTION OF THE INVENTION

Figure 3:
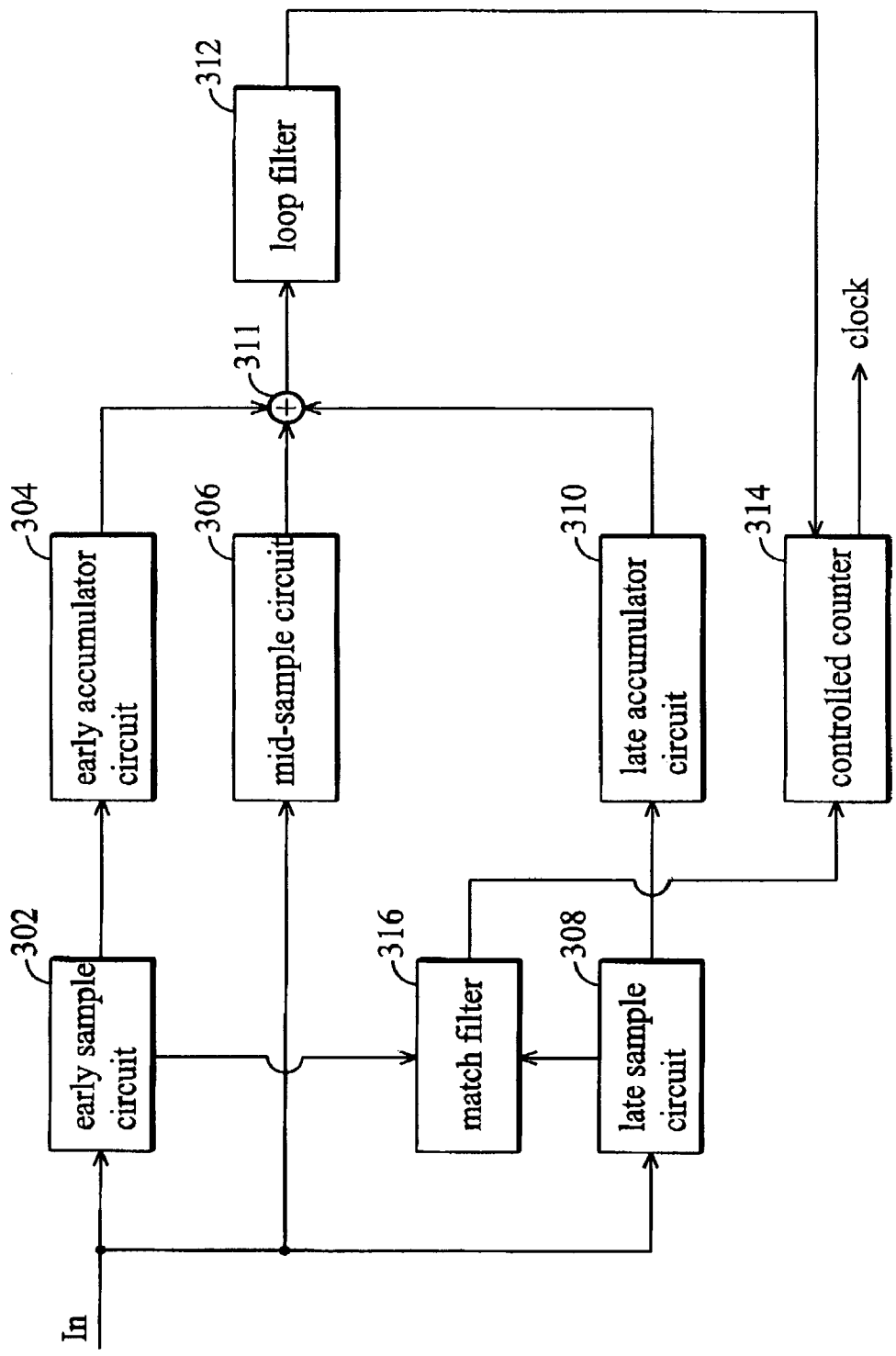
FIG. 3 is a block diagram illustrating an early-late gate recovery circuit according to the embodiment of the invention.

FIG. 3 is a block diagram illustrating an early-late gate recovery circuit according to the embodiment of the invention. The clock recovery circuit comprises an early sample circuit 302, an early accumulation circuit 304, a mid-sample circuit 306, a late sample circuit 308, a late accumulation circuit 310, an adder 311, a loop filter 312, a match filter 316, and a controlled counter 314.

A received signal In is input to the early-late gate recovery circuit. In the early-late gate recovery circuit, the received data is detected by the early sample circuit 302, mid-sample circuit 306 and late sample circuit 308. The match filter 316 comprises a conventional sample and hold circuit and some logic circuit. The match filter 316 filters the noise of the received signal and derives the first symbol from the received signal. When receiving the first symbol, the match filter 316 produces a control signal. In the controlled counter 314, the control signal approximately adjusts the output clock to produce at the middle of the symbol (referring to FIG. 4). Thus, the initial output clock of the early-late gate recovery circuit is produced at a nearly ideal impulse time. It takes little time to adjust the output clock to nearly stable status (the balance of the early gate and the late gate).

Figure 4:
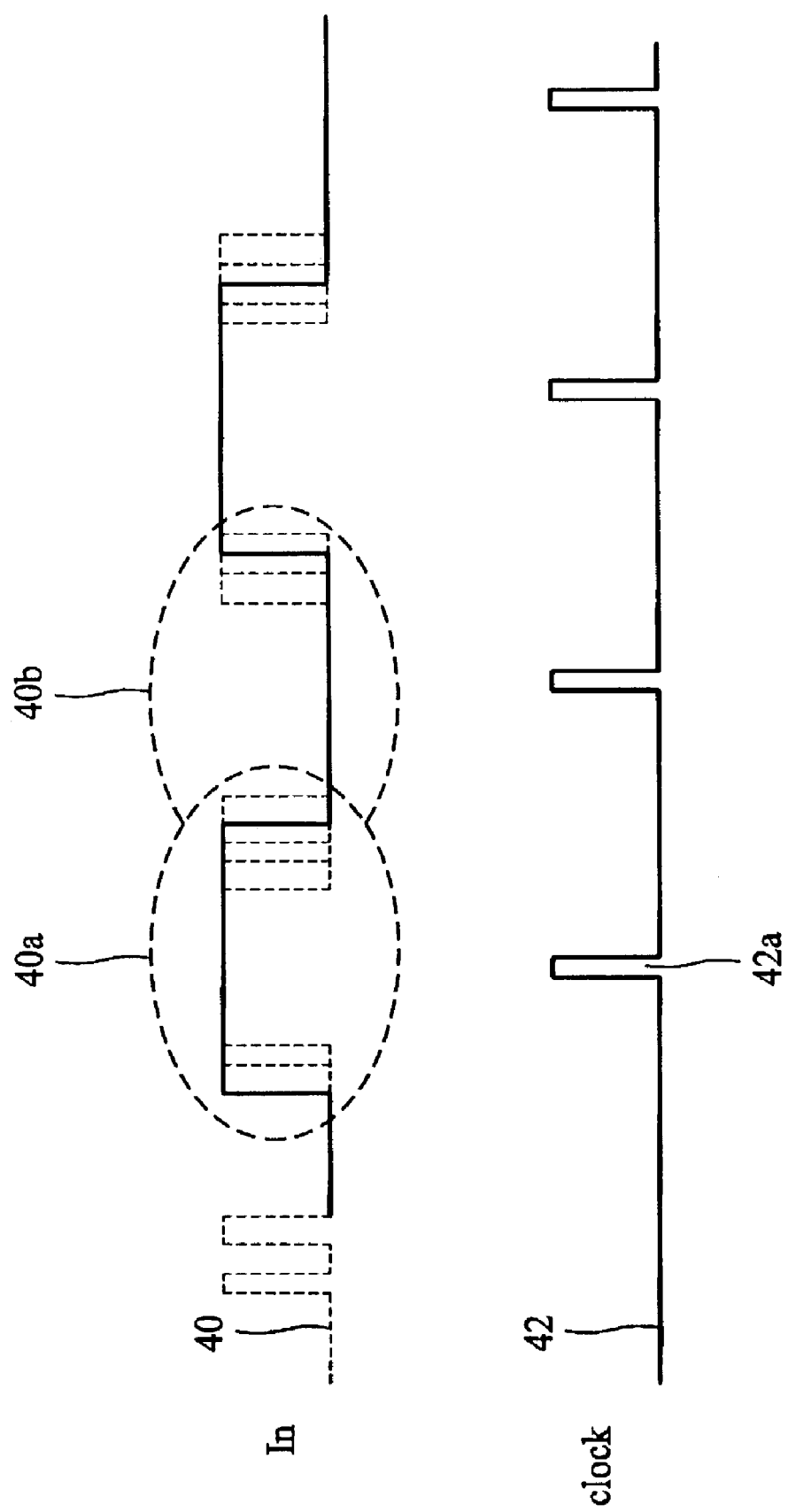
FIG. 4 is a schematic illustrating the output clock adjusted by the early-late gate recovery circuit in the embodiment of the present invention.

Furthermore, for the match filter 316 to adjust the output clock correctly, when receiving the second symbol, the match filter 316 also produces the control signal to approximately adjust the output clock to produce at the middle of the symbol in the controlled counter 314 (referring to FIG. 4).

An output signal of the mid-sample circuit 306 is input to the adder 311. The adder 311 performs operations of an output signal of the early accumulator circuit 304 and an output signal of the late accumulator circuit 310 according to the output signal of the mid-sample circuit 306. The operational result is input to the loop filter 312. The loop filter 312 judges whether to slightly adjust the impulse-producing time to make the controlled counter 314 produce the output clock in an ideal range.

In the embodiment of the invention, the first symbol or the second symbol is taken as an example for the match filter to find. In other communication systems, the match filter can derive an n-th symbol from the received signal to perform the same purpose. N is an integer.

Figure 1:
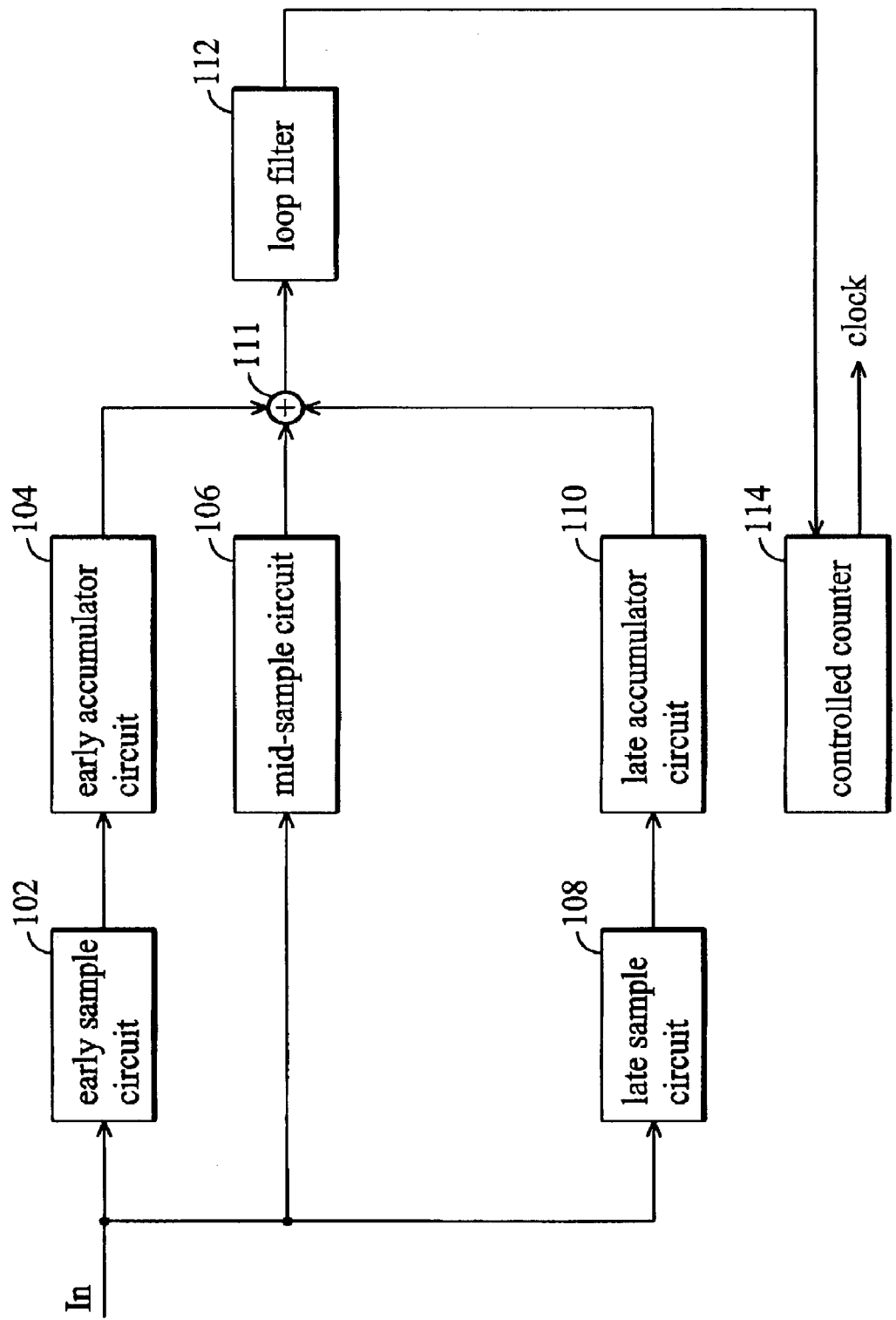
FIG. 1 is a block diagram illustrating an early-late gate recovery circuit in prior art.
Figure 2:
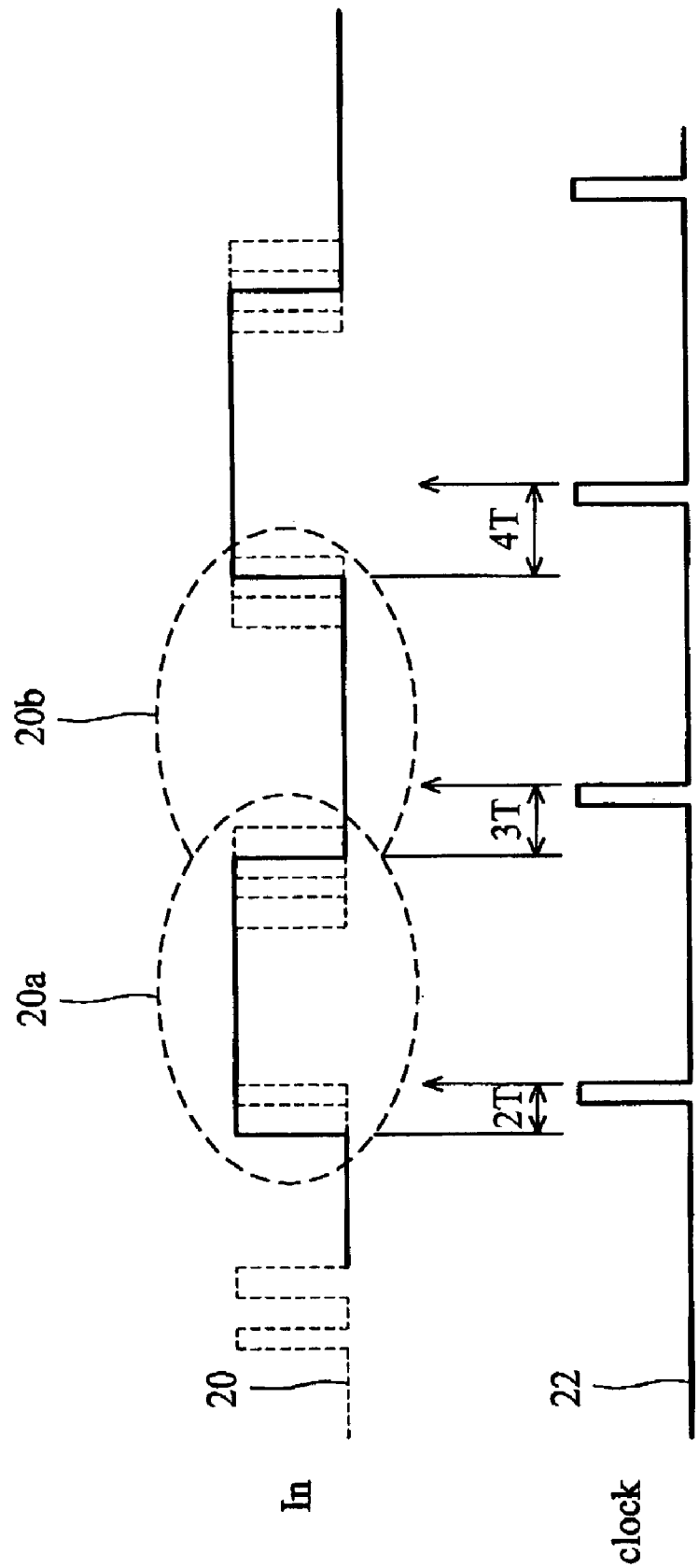
FIG. 2 is a schematic illustrating the output clock adjusted by the conventional early-late gate recovery circuit.

FIG. 4 is a schematic illustrating the output clock adjusted by the early-late gate recovery circuit in the embodiment of the present invention. Line 40 is a graph showing the received signal in received by the early-late gate recovery circuit. The dotted line of the line 20 is the noise of received data. The fist symbol of the received signal In is 40a. The second symbol of the received signal In is 40b. Line 22 is the graph showing the output clock of the conventional early-late gate recovery circuit. As shown in FIG. 2, the early-late gate recovery circuit adjusts the output clock according to the received data In. When receiving the first symbol 40a, the match filter produces a control signal. The control signal adjusts the output clock to produce at the middle of the symbol 42a in the controlled counter. Thus, the initial output clock of the early-late gate recovery circuit is produced at a nearly ideal impulse time. It takes little time for the loop filter 312 to judge whether to slightly adjust the impulse-producing time and for the controlled counter 314 to slightly adjust the output clock in the ideal range. Therefore, the purpose of the invention to reduce the time for the clock recovery circuit to extract the recovery clock, reduce the rate of loss packets and increase the transmission quality can be achieved.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A clock recovery circuit for establishing bit synchronization with a received signal, comprising:
   a first sample circuit having an early clock for detecting the received signal and generating a plurality of first sample signals for output;
   a first accumulation circuit for receiving the first sample signals and performing a summation operation to generate a first accumulated signal for output;
   a second sample circuit having a late clock for detecting the received signal and generating a plurality of second sample signals for output;
   a second accumulation circuit for receiving the second sample signals and performing a summation operation to generate a second accumulated signal for output;
   a third sample circuit having an on-time clock for detecting the received signal and generating a plurality of third sample signals for output;
   an adding device for computing the first sample signals and the second sample signals according to the third sample signals to generate an output signal;
   a loop filter for receiving the output signal to generate a first control signal output;
   a match filter for deriving an n-th symbol from the received signal by seeking the first sample signals and the second sample signals to generate a second control signal, wherein n is an integer; and
   a clock-producing device for generating a clock at an ideal impulse-producing time controlled by the first control signal and the second control signal.

2. The circuit of claim 1, wherein the ideal impulse-producing time is a middle point of the n-th symbol of the received signal.

3. The circuit of claim 1, wherein the clock-producing device is a controller counter.

4. A clock recovery circuit for establishing bit synchronization with a received signal, comprising:
   a first sample circuit having an input terminal, a first output terminal and a second output terminal, the input terminal receiving the received signal;
   a first accumulation circuit having an input terminal and an output terminal, the input terminal coupled to the first output terminal of the first sample circuit;
   a second sample circuit having an input terminal, a first output terminal and a second output terminal, the input terminal receiving the received signal;
   a second accumulation circuit having an input terminal and an output terminal, the input terminal coupled to the first output terminal of the second sample circuit;
   a third sample circuit having an input terminal and an output terminal, the input terminal receiving the received signal;
   an adding device having a first input terminal, a second input terminal, a third input terminal and an output terminal, the first input terminal coupled to the output terminal of the first accumulation circuit, the second input terminal coupled to the output terminal of the second accumulation circuit, the third input terminal coupled to the output terminal of the third sample circuit;
   a loop filter having an input terminal and an output terminal, the input terminal coupled to the output terminal of the adding device;
   a match filter having a first input terminal, a second input terminal and an output terminal, the first input terminal coupled to the second output terminal of the first sample circuit, the second input terminal coupled to the second output terminal of the second sample circuit; and
   a clock-producing device having a first input terminal, a second input terminal and an output terminal, the first input terminal coupled to the output terminal of the loop filter, the second input terminal coupled to the output terminal of the match filter, the clock-producing device outputting a clock generated at an ideal impulse-producing time from the output terminal.

5. The circuit of claim 4, wherein the ideal impulse-producing time is a middle point of the n-th symbol of the received signal.

6. The circuit of claim 4, wherein the clock-producing device is a controller counter.

* * * * *